Dec. 24, 1968 R. L. LICH 3,417,711
MULTI-INTERCONNECTED TRUCK RAIL VEHICLE
Filed Sept. 21, 1966 3 Sheets-Sheet 1

INVENTOR
RICHARD L. LICH
BY Bedell & Burgess
ATTORNEYS

United States Patent Office 3,417,711
Patented Dec. 24, 1968

3,417,711
MULTI-INTERCONNECTED TRUCK RAIL VEHICLE
Richard L. Lich, Pasadena Hills, Mo., assignor to General Steel Industries, Inc., Granite City, Ill., a corporation of Delaware
Filed Sept. 21, 1966, Ser. No. 581,067
12 Claims. (Cl. 105—157)

ABSTRACT OF THE DISCLOSURE

A suspension for railway vehicle body directly on two pairs of trucks whereby the vehicle is operable on horizontally curved track and on track having vertical curvature without affecting the equal distribution of load to the axles and without requiring the provision of span bolsters between the trucks and the underframe. The vertical load supporting bearings of the individual trucks of each pair are hydraulically interconnected to produce reverse vertical movements of the individual trucks as required by vertical track curvature and the vertical axis pivot bearings of the individual trucks of each pair are hydraulically interconnected to produce reverse transverse movements of the individual trucks as required by horizontal track curvature.

---

The invention relates to railway rolling stock and consists particularly in improved means for supporting a railway vehicle underframe on a plurality of trucks.

Heavy duty railway vehicles frequently require a greater number of axles than can conveniently be accommodated in the usual pair of trucks. Under such conditions, the conventional solution is to provide four trucks, mount a span bolster on each end pair, and mount the underframe on the span bolster. This provides a very flexible arrangement for rounding curves and equal load distribution to the axles. It is, however, disadvantageous in that the span bolsters require additional vertical space between the trucks and underframe, necessitating a relatively high car deck, which in turn limits the permissible height of the lading. The latter severely restricts the utility of such cars, since the heavy ladings which they are designed to carry are often very high. The same conditions apply in the case of high horsepower diesel electric locomotives where a large number of axles is required. If span bolsters are used, the underframe must be elevated sufficiently to accommodate them, and the underframe-supported diesel engines and their accessories are raised until vertical clearance limits are encountered and the center of gravity is at a proportionately high level. Span bolsters also add greatly to the light weight of heavy duty cars which, of course, reduces the permissible weight of the lading.

It is accordingly an object of this invention to provide a multiple truck suspension, without span bolsters, for cars and locomotives.

It is a further object to provide hydraulic intertruck connections capable of simulating the action of a span bolster vertically and laterally of the vehicle.

The foregoing and additional more detailed objects and advantages of the invention will be evident from the following description and the accompanying drawings, in which.

Figure 1:
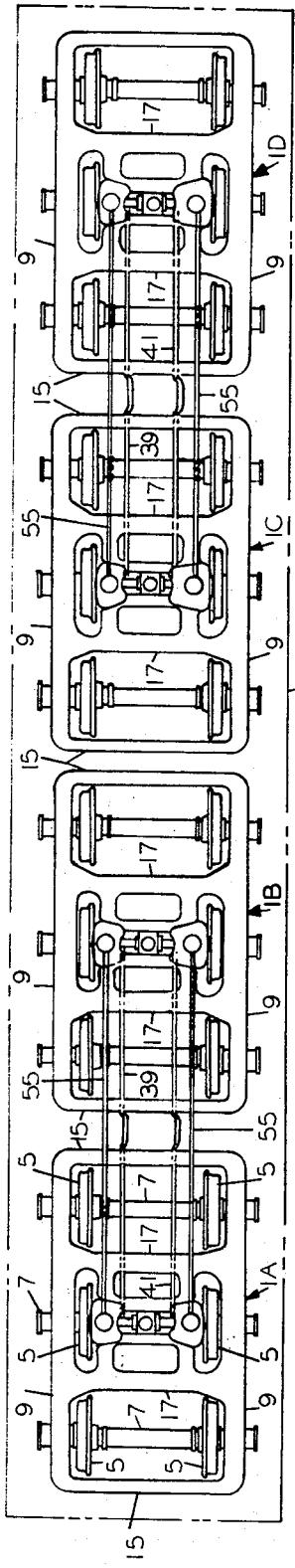
FIG. 1 is a top view of four trucks of a heavy duty car hydraulically connected to each other in accordance with the invention.
Figure 2:
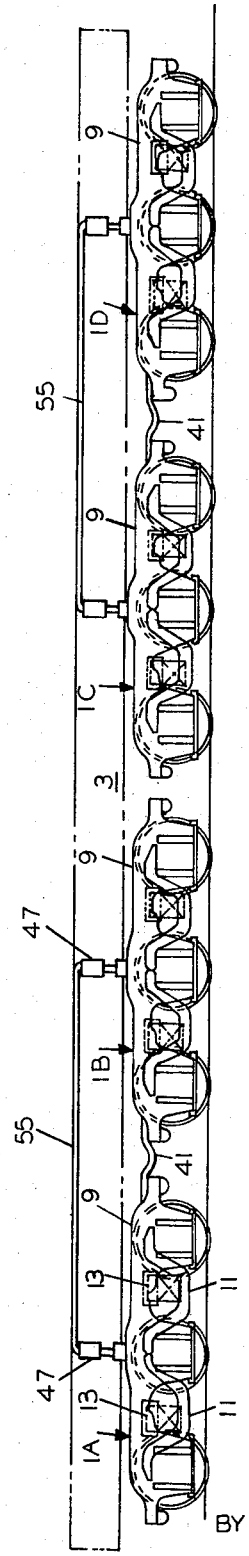
FIG. 2 is a side elevation view of the arrangement illustrated in FIG. 1.
Figure 3:
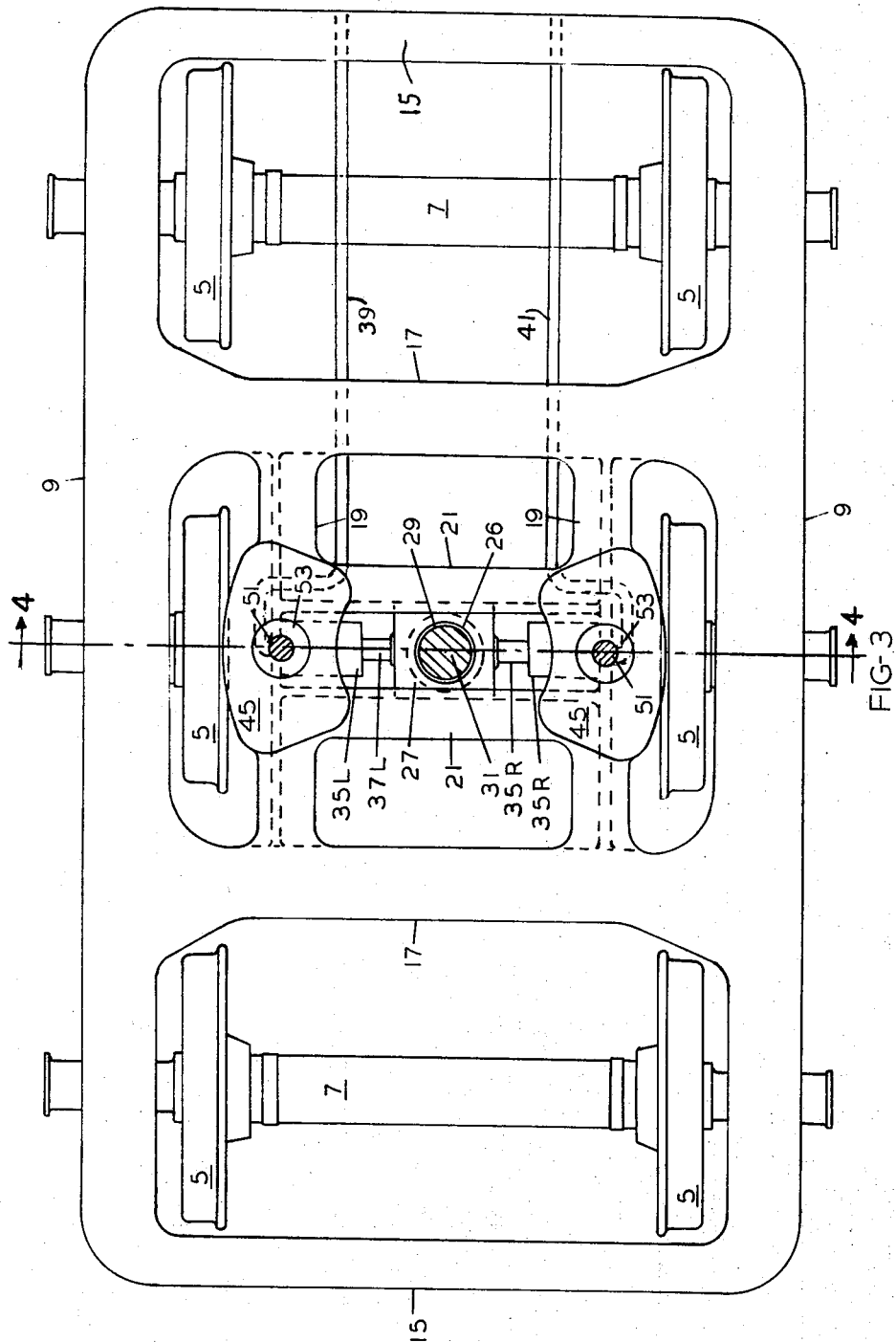
FIG. 3 is an enlarged plan view of one of the trucks illustrated in FIGS. 1 and 2.

In FIGS. 1 and 2, the numerals 1A, 1B, 1C and 1D refer, respectively, to four six-wheel trucks aligned with each other and spaced apart a short distance from each other lengthwise of a car underframe 3. Trucks 1A, 1B, 1C and 1D are identical and each has six wheels 5 mounted in transversely spaced pairs on axles 7, which are spaced apart lengthwise of the truck. A rigid truck frame comprises spaced longitudinally extending side members 9, 9 supported from axles 7 by equalizers 11 and springs 13, end transoms 15 and intermediate transoms 17. Intermediate transoms 17 are disposed between the middle and end wheels of the truck and are connected immediately inwardly of the wheels of the middle axle by transversely spaced longitudinally extending side bearing beams 19, 19. The latter are connected by a pair of transverse center beams 21, 21 spaced apart longitudinally of the truck and symmetrically disposed with respect to the center of the truck. Between the upper and lower flanges 23 and 25 of transverse beams 21 is slidably mounted a block 27 formed with a concave spherical section aperture 26 in which is rotatably received a spherical block 28. The latter is formed with a vertical cylindrical aperture 29 in which is pivotally received a cylindrical element 31 vertically depending from the center of underframe 3. It will be understood that there are four such cylindrical elements 31, one of which is pivotally received in blocks 27, 28 of each of the trucks 1A, 1B, 1C and 1D. This arrangement accommodates swivel, longitudinal tipping, transverse tilting, and lateral movement between the underframe and each truck.

At each side of block 27, in the space between it and the webs of longitudinal side bearing beams 19, left and right cylinders 35L and 35R, respectively, are mounted on the truck frame, their pistons 37L and 37R respectively being connected to the sides of pivot block 27. When the car is on straight track and block 27 is centered transversely of the truck, pistons 37L and 37R are centered respectively of their cylinders 35L and 35R and the cylinders are filled with hydraulic fluid F on the transversely outer sides of pistons 37L and 37R.

As best seen in FIG. 1, the outer end of cylinders 35L and 35R of trucks 1A and 1C are connected respectively by hydraulic conduit means 39 and 41 respectively to the corresponding cylinders 35L and 35R of trucks 1B and 1D. Hydraulic conduits 39 and 41 are also filled with hydraulic fluid F so that each pair of connected cylinders and the conduit connecting them constitutes a closed, fixed-volume hydraulic system whereby as the car rounds a curve, the movement of the leading truck of each pair toward the inside of the curve respectively will cause a corresponding outward movement, radially of the curve, of the trailing truck of each pair.

For example, if the car in FIGS. 1 and 2 is moving to the right and enters a right hand curve, truck 1D will initially be moved off center toward the right side of the car. This will cause its cylinder 35L to move to the right with respect to piston 37L. This will cause hydraulic fluid to be forced through conduit 41 to cylinder 35L of truck 1C, causing the cylinder 35L of truck 1C to urge truck 1C to the left relative to the underframe 3 the same distance that truck 1D moved to the right. Similarly, this movement will be accommodated by the flow of fluid from cylinder 35R on truck 1C as its piston 37R moves to the right to cylinder 35R of truck 1D, filling the enlarged chamber therein formed by the leftward movement of piston 37R of truck 1D. Continuing the movement of the car to the right and around the same right hand curve, as truck 1B enters the curve, its cylinders coact with those of truck 1A in the same manner as did those of trucks 1D and 1C. This action simulates the action of a mechanical connection such as a conventional span bolster.

Figure 4:
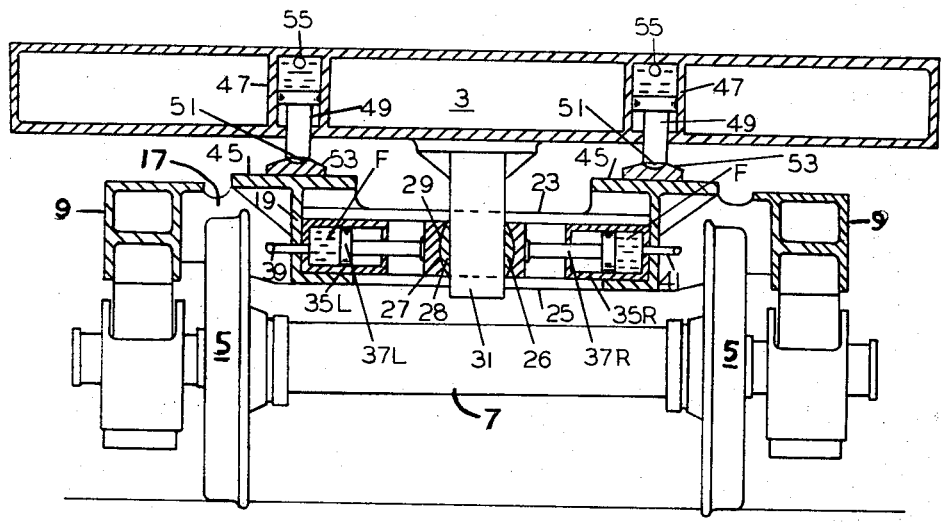
FIG. 4 is a transverse vertical sectional view along lines 4—4 of FIG. 3.

For supporting the underframe vertically on the four trucks, each truck is provided, on the top surface of longitudinal center member 19, 19, with an arcuate, upwardly facing horizontal bearing surface 45, and the underframe is formed with a pair of cylinders 47 vertically disposed and in transverse alignment with depending cylindrical bosses 31 associated with each of the trucks. Cylinders 47 are centered with respect to bearing surfaces 45, 45. Pistons 49 are slidably mounted in cylinders 47 and their lower ends are in the form of convex spherical segments seated in sockets 50 of similar concave spherical segment shape in the upper surfaces of downwardly facing shoes 53, which rest on and are slidable with respect to upwardly facing horizontal bearing surfaces 45 on the truck frames to accommodate swiveling and transverse movements of the truck frame relative to the underframe. Cylinders 47 of adjacent end trucks 1A and 1B and 1C and 1D respectively are connected by hydraulic conduits 55 to form closed, fixed-volume hydraulic systems, and each system, comprising a pair of cylinders and the interconnecting conduit is filled with hydraulic fluid H of such quantity that on level track pistons 49 are centrally positioned in their cylinders 47, as in FIG. 4. With this arrangement, when vertical curves are encountered, as for example, if the car is moving from left to right (as viewed in FIGS. 1 and 2) and truck 1D is urged upwardly by a rise in the track, pistons 49 associated with truck 1D will be caused to move upwardly in their cylinders 47, thereby forcing fluid H through conduits 55 into cylinders 47 associated with truck 1C so as to cause pistons 49 associated with truck 1D to move downwardly, maintaining the associated shoes 53 in engagement with bearing surfaces 45 of truck 1C. This would cause some tilting upwardly of the forward (right hand) end of underframe 3, causing a downward movement of piston 49 in cylinder 47 associated with truck 1B and a corresponding upward movement of piston 49 associated with truck 1A so that, at all times, the load would be equally distributed to the trucks irrespective of vertical track curvature.

The details of the structure may be modified substantially without departing from the spirit of the invention and the exclusive use of such modifications as come within the scope of the appended claims is contemplated.

What is claimed is:

1. In a railway vehicle, supported structure comprising a single underframe, supporting structure comprising two pairs of trucks aligned longitudinally of the vehicle and spaced apart from each other longitudinally thereof, vertically opposing bearing means on said underframe and trucks supporting said underframe directly on said trucks, cooperating vertical axis pivot bearing means on said underframe and said trucks accommodating swivel of said trucks about vertical axes, and additional means interconnecting one of said structures with the pivot bearing means associated with the individual trucks of said pairs of trucks for causing the individual trucks of said pairs to move in opposite directions transversely of said underframe when the vehicle is on curved track.

2. In a railway vehicle according to claim 1, said additional means comprising transversely extending double-acting hydraulic cylinder and piston means disposed between one of said structures and said pivot bearing means, and hydraulic connections between corresponding ends of said cylinder means associated with the individual trucks of said pairs, each pair of connected ends of said cylinder means and said connection therebetween forming a closed, fixed-volume fluid-filled hydraulic system.

3. In a railway vehicle according to claim 2, said pivot forming means comprising four vertical cylindrical members carried by one of said structures and four transversely movable bearing elements carried by said other structure and each pivotally receiving one of said cylindrical members.

4. In a railway vehicle according to claim 3, said double-acting cylinder means comprising pair of oppositely acting cylinder and piston assemblies between said bearing elements and said other structure, corresponding cylinders associated with the end pairs of trucks being hydraulically connected to each other, each pair of connected cylinders forming with each other a closed, fixed-volume fluid-filled hydraulic system.

5. In a railway vehicle according to claim 4, said cylindrical members depending from said underframe, said trucks each having frame means forming a transverse guide for said transversely movable pivot bearing elements and a support for said oppositely acting cylinders on both sides of said bearing element.

6. In a railway vehicle according to claim 1, vertically opposing bearing means including vertically disposed single-acting hydraulic cylinder and piston assemblies between said underframe and each of said trucks, and means hydraulically interconnecting said assemblies associated with the individual trucks of said pairs, each connected pair of said assemblies and said interconnecting means therebetween forming a closed, fixed-volume fluid-filled hydraulic system.

7. In a railway vehicle according to claim 6, said pivot bearing means being fixed with respect to one of said structures and movable transversely with respect to the other of said structures, said additional means comprising transversely extending double-acting hydraulic cylinder means disposed between said other structure and said pivot bearing means, and a hydraulic connection between corresponding ends of said cylinder means associated with said pivot forming means of the individual trucks of said pairs, each pair of connected ends of said cylinder means and said connection therebetween forming a closed, fixed-volume fluid-filled hydraulic system.

8. In a railway vehicle according to claim 6 in which said vertically disposed cylinder and piston assemblies are mounted on one of said structures intermediate the ends of each of said trucks and said other structure has horizontal bearing surfaces slidably engaging each of said vertically disposed assemblies.

9. In a railway vehicle, supported structure comprising a frame, a plurality of supporting structures aligned longitudinally of the vehicle and spaced apart from each other longitudinally thereof, means supporting said frame from each of said supporting structures, said means comprising vertically disposed individual hydraulic cylinder and piston assemblies between said frame and said structures, and conduits interconnecting pairs of adjacent assemblies longitudinally of the vehicle, each pair of interconnected assemblies and their interconnecting conduit forming a closed, fixed-volume fluid-filled hydraulic system.

10. In a railway vehicle according to claim 9, there being a transversely spaced pair of said longitudinally interconnected assemblies.

11. In a railway vehicle according to claim 10, each of said supporting structures comprising a multi-axle truck, and said frame being the underframe of the vehicle.

12. In a railway vehicle according to claim 11, there being four of said trucks, the assemblies between the adjacent end trucks and said underframe only being so interconnected.

References Cited

UNITED STATES PATENTS

| | | | |
|---|---|---|---|
| 2,099,361 | 11/1937 | Hamilton et al. | 105—176 X |
| 2,474,471 | 6/1949 | Dolan | 105—199 X |
| 2,755,746 | 7/1956 | Kreissig | 105—168 X |

FOREIGN PATENTS 209,932 4/1940 Switzerland.

ARTHUR L. LA POINT, *Primary Examiner.*

H. BELTRAN, *Assistant Examiner.*

U.S. Cl. X.R.

105—168, 175, 176, 199